(No Model.)
L. C. HICKS.
DUMPING WAGON.
No. 504,304.  Patented Aug. 29, 1893.
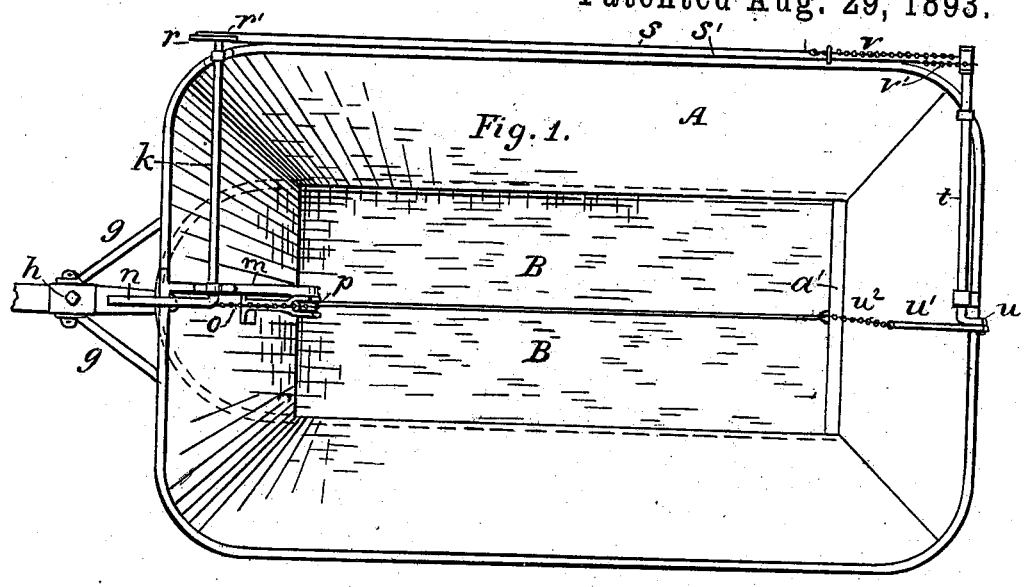
Fig. 1.
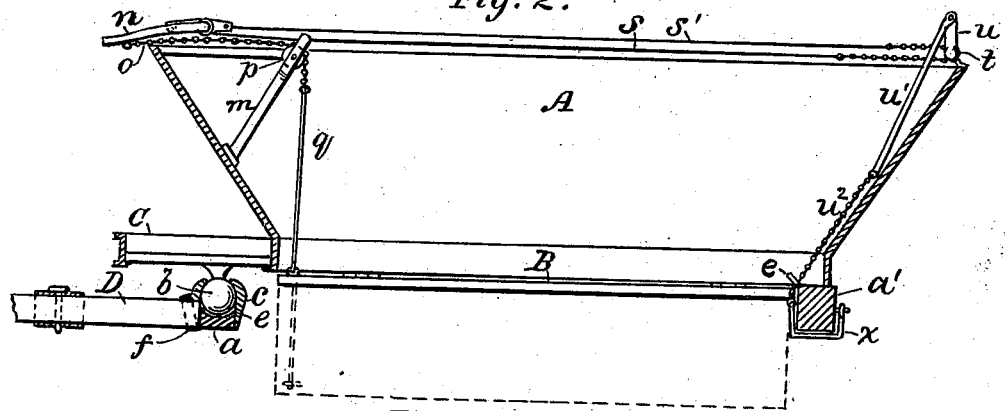
Fig. 2.
Fig. 3.
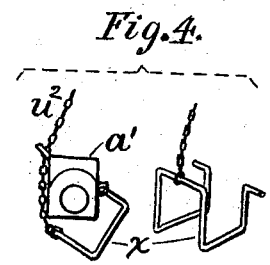
Fig. 4.
Fig. 5.
Witnesses:
G. B. Towles
J. M. Copenhaver
Inventor:
Lewis C. Hicks
By H. A. Daniels
Attorney

United States Patent Office.

LEWIS C. HICKS, OF ONAWA, IOWA, ASSIGNOR OF ONE-HALF TO MITCHELL VINCENT, OF SAME PLACE.

DUMPING-WAGON.

SPECIFICATION forming part of Letters Patent No. 504,304, dated August 29, 1893.

Application filed May 18, 1892. Serial No. 433,442. (No model.)

*To all whom it may concern:*

Be it known that I, LEWIS C. HICKS, a citizen of the United States of America, residing at Onawa, in the county of Monona and State of Iowa, have invented certain new and useful Improvements in Dumping-Wagons, of which the following is a specification, reference being had therein to the accompanying drawings.

The invention relates to dumping wagons which are constructed to discharge the contents of the wagon from the bottom, and consists in certain improvements in the construction of such wagons, as hereinafter described and claimed.

In the accompanying drawings Figure 1 represents a plan view of a dumping wagon having my improvements. Fig. 2 is a longitudinal, vertical section, the wheels being removed. Fig. 3 illustrates the shafts $k$, and $t$, herein referred to, and connections of said shafts. Fig. 4 illustrates an axle of the wagon and a bail connected therewith. Fig. 5 illustrates in section the floor of the wagon box with connections.

A designates the wagon box, the floor of which is made in two parts B, the division being along its longitudinal center, said parts being hinged at their outer edges to the sides of the box and constructed to be opened downward for discharging the contents of the box.

At the top of the wagon box and at the front end is a shaft $k$ which is mounted in bearings one of which is on said box near a front corner, the other being on a bracket $m$, secured to the front board of the box as shown. A lever $n$ is secured to the inward end of the shaft $k$ which may be turned in either direction by means of said lever. A chain $o$ is connected with the lever $n$ and passed over a pulley $p$, carried by said bracket, and connected with the upper ends of two rods $q$ which are connected with the hinged sections B of the floor.

Rigidly attached to the outer end of the shaft $k$, is a small plate which forms two small arms $r\ r'$, at right angles with said shaft, the arm $r$ being somewhat longer than the arm $r'$. Two rods $s\ s'$ are connected with the arms $r\ r'$, the rod $s$ being connected with the arm $r$ and the rod $s'$ being connected with arm $r'$ and both rods extending rearward along the side of box A as shown.

At the rear end of the box A, at the top, is mounted a shaft $t$, in bearings carried by said box and in position similar to that of shaft $k$. To the shaft $t$, at its outer end, are attached the chains $v$, $v'$, which are connected with the rear ends of the rods $s$, $s'$. The chains $v\ v'$ are so connected with the shaft $t$ that by turning the forward shaft $k$ one way or the other, a like movement is imparted to the rear shaft $t$. On the inward end of the shaft $t$ is a small arm $u$, to the free end of which is coupled one end of a rod $u'$, the latter being connected by a chain with a clevis or bail $x$ which is hung to the rear side of the rear axle $a'$. The chain $u^2$ passes through an eye $e$ on the rear axle and between the parts B of the floor for connection with the bail, the latter being bent in a somewhat rectangular form so as to close on the axle $a'$ from below after the parts B of the floor have been closed. When the wagon is closed at the bottom to receive a load, the shafts $k$ and $t$ and their connections are in positions as shown in Fig. 1. To dump the load, the forward shaft, by means of lever $n$, is turned rearward, and the shaft $t$ with arm $u$, being turned forward, the doors of the floor B are opened by gravity and the contents of the box are discharged. To close the bottom of the box, the shaft $k$ is turned forward and the doors or lids B are closed by the chain and rods connected with the lever $n$. Before the doors are quite closed by the movement of the lever, a rotative movement is imparted to the shaft $t$, which, through the arm $u$ and its connection with the bail $x$, draws up the said bail so that it closes about the rear axle and presses upward against the doors B, thus closing them.

I claim—

1. The combination, with a wagon body, having a floor made in two parts and hinged to opposite parts of said body, of a shaft $k$, mounted on the front part of said body and provided with a hand-lever which is connected with both parts of said floor by chain passed over a pulley, two arms, $r$, $r'$, fastened to the outer end of shaft $k$, a shaft $t$ mounted at the rear end of said body and provided with an arm $u$, chains or rods connecting arms, $r$, $r'$, with shaft $t$, so that when shaft $k$ is turned in either direction, the shaft $t$ is correspondingly turned, and devices connected with arm $u$ of shaft $t$ for securing said hinged floor in its closed position, substantially as and for the purposes described.

2. The combination, with the box of a wagon, having a floor formed of two hinged parts, of a shaft, mounted on the fore part of said box and having two arms on the outer end of said shaft; another shaft mounted on the rear part of said box, chains or rods, so connected with said rear shaft and with said arms of said forward shaft, that when the latter is turned in either direction, a corresponding movement is imparted to said rear shaft, substantially as set forth.

3. The combination with the body of a wagon having a floor, formed of two hinged parts, of a shaft, mounted in bearings carried by said body and provided with an arm $u$, mechanism for turning said shaft, an axle of said wagon and a bail constructed to be closed about said axle, being connected therewith and also with said arm $u$, substantially as set forth and described.

In testimony whereof I have affixed my signature in presence of two witnesses.

LEWIS C. HICKS.

Witnesses:
S. B. MARTIN,
A. F. FAIRCHILD.